(12) United States Patent
Tseng et al.

(10) Patent No.: US 12,149,865 B2
(45) Date of Patent: Nov. 19, 2024

(54) CONFERENCE SYSTEM AND OPERATION METHOD THEREOF

(71) Applicant: AmTRAN Technology Co., Ltd., New Taipei (TW)

(72) Inventors: Chiung Wen Tseng, New Taipei (TW); Yu Ruei Lee, New Taipei (TW); I Jui Yu, Taoyuan (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 210 days.

(21) Appl. No.: 17/810,828

(22) Filed: Jul. 5, 2022

(65) Prior Publication Data

US 2023/0124003 A1 Apr. 20, 2023

Related U.S. Application Data

(60) Provisional application No. 63/262,752, filed on Oct. 20, 2021.

(30) Foreign Application Priority Data

Feb. 17, 2022 (TW) .................................. 111105896

(51) Int. Cl.
*H04N 7/14* (2006.01)
*G06V 20/52* (2022.01)
*G06V 40/20* (2022.01)
*H04L 12/18* (2006.01)
*H04L 65/403* (2022.01)
(Continued)

(52) U.S. Cl.
CPC ............. *H04N 7/147* (2013.01); *G06V 20/53* (2022.01); *G06V 40/28* (2022.01); *H04L 12/18* (2013.01); *H04L 65/403* (2013.01); *H04M 1/72433* (2021.01); *H04M 1/72436* (2021.01); *H04N 7/15* (2013.01); *G06T 7/60* (2013.01);
(Continued)

(58) Field of Classification Search
None
See application file for complete search history.

(56) References Cited

U.S. PATENT DOCUMENTS

2009/0210491 A1 * 8/2009 Thakkar .............. H04L 12/1822
709/204
2010/0207874 A1 * 8/2010 Yuxin .................... G06Q 30/02
345/156
(Continued)

FOREIGN PATENT DOCUMENTS

| CN | 111596760 A | 8/2020 |
|---|---|---|
| CN | 111831120 A | 10/2020 |
| CN | 113507542 A | 10/2021 |

*Primary Examiner* — Quoc D Tran
(74) *Attorney, Agent, or Firm* — CKC & Partners Co., LLC

(57) ABSTRACT

A conference system, including a remote device and a local device, is disclosed. The remote device includes a voice broadcasting element. The local device includes several image capture elements and a processor. When the remote device is communicatively connected through an internet to the local device, several image capture elements obtain a number of people present in a local environment of the local device. The processor, coupled to several image capture elements, generates a voice message according to the number of people present, and the processor transmits the voice message to the remote device, so that the voice broadcasting element of the remote device plays the voice message.

20 Claims, 7 Drawing Sheets

(51) Int. Cl.
  *H04M 1/72433*   (2021.01)
  *H04M 1/72436*   (2021.01)
  *H04N 7/15*      (2006.01)
  *G06T 7/60*      (2017.01)

(52) U.S. Cl.
  CPC ............... *G06T 2207/30201* (2013.01); *G06T 2207/30242* (2013.01)

(56) References Cited

U.S. PATENT DOCUMENTS

| | | | |
|---|---|---|---|
| 2012/0179981 A1* | 7/2012 | Whalin | G06Q 30/02 715/753 |
| 2014/0040928 A1* | 2/2014 | Thies | G06F 18/00 725/10 |
| 2014/0201767 A1* | 7/2014 | Seiden | H04N 21/4325 725/12 |
| 2016/0180259 A1* | 6/2016 | Marianko | H04L 65/1069 705/5 |
| 2016/0234264 A1* | 8/2016 | Coffman | H04L 65/4015 |
| 2016/0306504 A1* | 10/2016 | Brunsch | H04N 7/15 |
| 2019/0130365 A1* | 5/2019 | Pell | G06Q 10/1095 |
| 2020/0234251 A1* | 7/2020 | Ma | G07C 9/27 |
| 2021/0105167 A1* | 4/2021 | Eilam | H04L 1/0061 |

* cited by examiner

CONFERENCE SYSTEM AND OPERATION METHOD THEREOF

CROSS-REFERENCE TO RELATED APPLICATION

This application claims priority to U.S. Provisional Application Ser. No. 63/262,752 filed Oct. 20, 2021, and Taiwan Application Serial Number 111105896, filed Feb. 17, 2022, the disclosures of which are incorporated herein by reference in their entireties.

BACKGROUND

Technical Field

The present disclosure relates to a conference system and an operation method thereof, and more particularly, a conference system and an operation method thereof of remote conference.

Description of Related Art

With the development of science and technology, the conference internet camera has also developed from a single lens to a multi-lens. The conference internet camera is not only a simple lens, but also includes a conference internet camera with a microphone and speakers. With the change of design, more and more products are not set up on the screen, but on the conference table. The advantage of this design is that by placing closer to the user, through the use of several lenses, every participant in the meeting can be photographed as much as possible, and the audio can be better received. But at the same time, users also have a lot of expectations for this product, expecting it to bring more convenience and benefits. Just like mobile phones and other electronic products, in addition to basic calls, users also expect this product to have more functions.

SUMMARY

The summary aims at providing a simplified summary of the present disclosure, so that the reader has a basic understanding of the present disclosure. This summary is not a complete overview of the disclosure, and it is not intended to point out important/critical elements of embodiments of the present disclosure or define the scope of the present disclosure.

An object of the present disclosure is to provide a conference system. The conference system includes a remote device and a local device. The remote device includes a voice broadcasting element. The local device includes several image capture elements and a processor. When the remote device is communicatively connected through an internet to the local device, several image capture elements obtain a number of people present in a local environment of the local device. The processor, coupled to several image capture elements, generates a voice message according to the number of people present in the local environment, and the processor transmits the voice message to the remote device, so that the voice broadcasting element of the remote device plays the voice message.

Another aspect of the present disclosure is to provide an operation method of a conference system. The conference system includes a remote device and a local device. The operation method includes the following operations: obtaining a number of people present of a local environment of the local device by several image capture elements of the local device when the remote device is communicatively connected through an internet to the local device; generating a voice message by a processor of the local device according to the number of people present in the local environment, and transmitting the voice message to the remote device; and playing the voice message by a voice broadcasting element of the remote device.

BRIEF DESCRIPTION OF THE DRAWINGS

The present disclosure can be more fully understood by reading the following detailed description of the embodiment, with reference made to the accompanying drawings as follows.

DETAILED DESCRIPTION

The term "coupled" as used herein may also refer to "electrically coupled", and the term "connected" may also refer to "electrically connected". "Coupled" and "connected" may also refer to two or more elements cooperating or interacting with each other.

Figure 1:
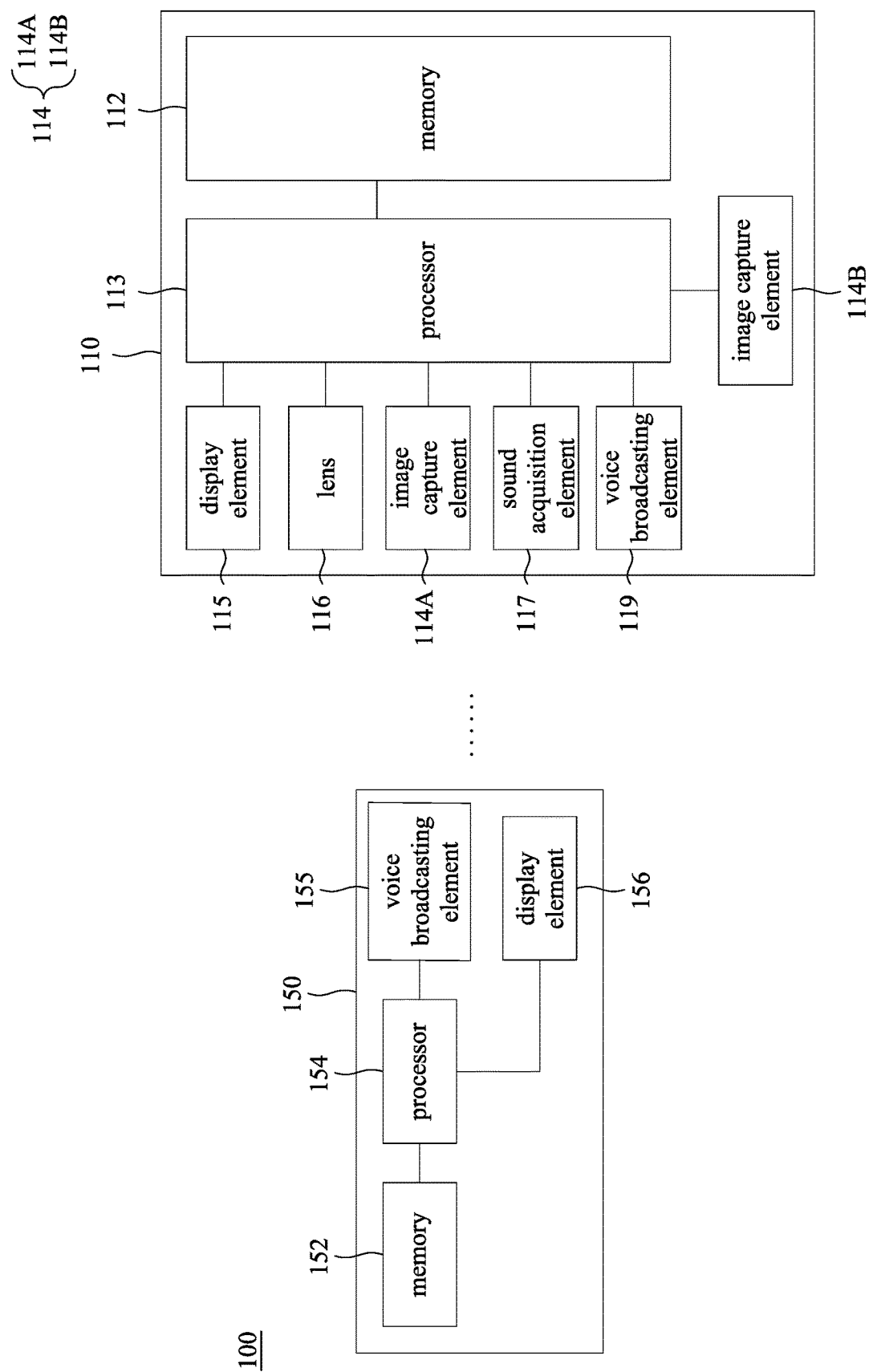
FIG. 1 is a schematic diagram illustrating a conference system according to some embodiments of the present disclosure.

Reference is made to FIG. 1. FIG. 1 is a schematic diagram illustrating a conference system 100 according to some embodiments of the present disclosure.

Taking FIG. 1 as an example. The conference system 100 includes a local device 110 and a remote device 150. Generally speaking, the local device 110 and the remote device 150 are located in different places and are connected through internet communication during connection.

The local device 110 includes a memory 112, a processor 113, an image capture element 114 (including 114A and 114B), a display element 115, a lens 116, a sound acquisition element 117 and a voice broadcasting element 119. In the connection relationship, the processor 113 is coupled to the image capture elements 114A, 114B, the display element 115, the lens 116, the sound acquisition element 117 and the voice broadcasting element 119, and the processor 113 is coupled to the memory 112.

The remote device 150 includes the memory 152, the processor 154, the voice broadcasting element 155 and the display element 156. In the connection relationship, the processor 154 is coupled to the memory 152, the voice broadcasting element 155 and the display element 156.

The above-described configuration of the conference system 100 is for illustrative purposes only, and various configurations of the conference system 100 are within the scope of the present disclosure. For example, in some embodiments, the image capture elements 114A, 114B, the display element 115, the lens 116, the sound acquisition element 117 and the voice broadcasting element 119 can be arranged outside the local device 110 and transmit signals to the local device 110 or receive signal by the local device 110. For another example, in some embodiments, the voice broadcasting element 155 and the display element 156 can be arranged outside the remote device 150 and transmit signals to the remote device 150 or receive signals by the remote device 150.

The detailed operation of the conference system 100 will be described below in reference to the flowchart of FIG. 2.

Figure 2:
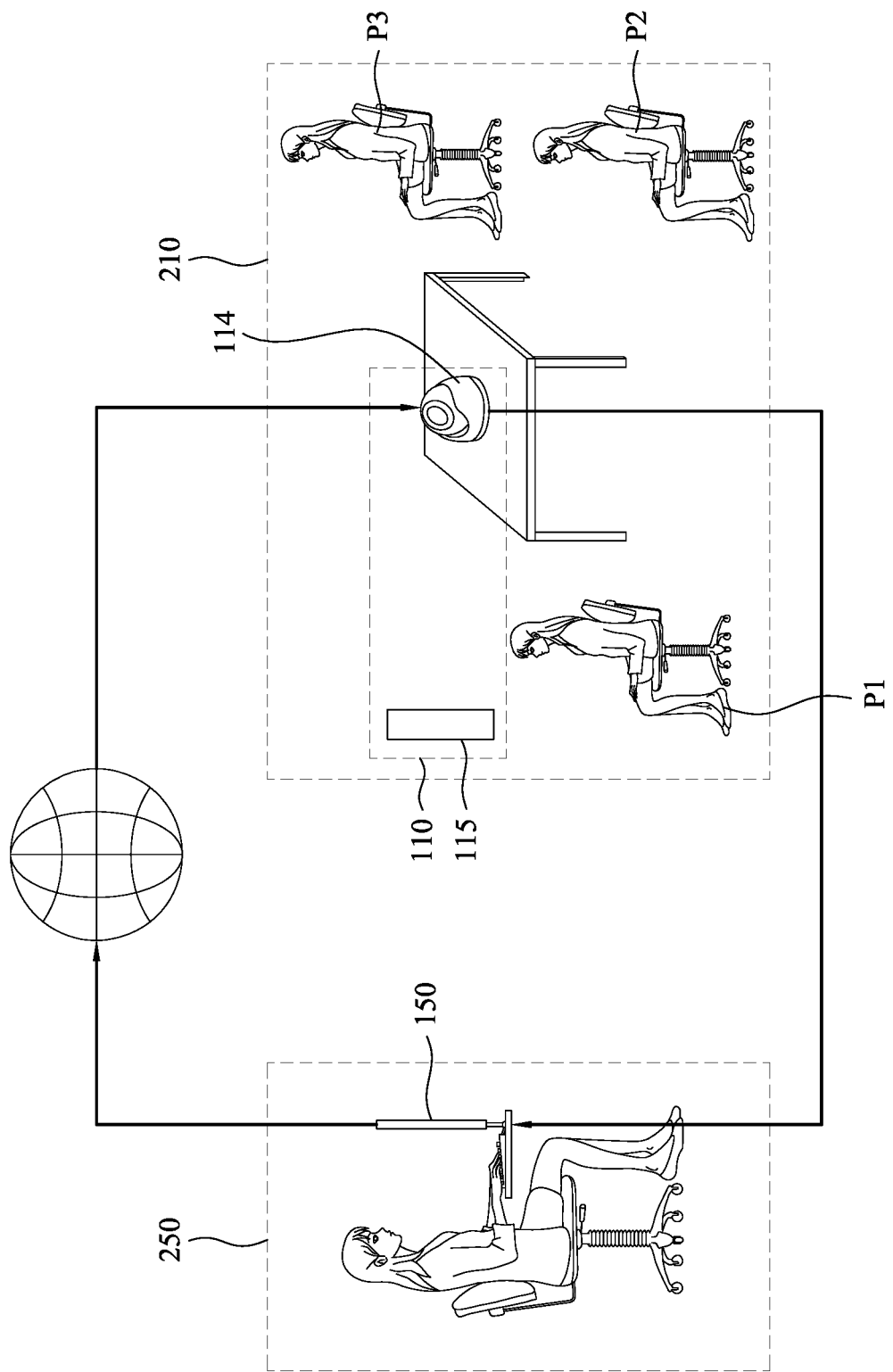
FIG. 2 is a flow chart illustrating operating scenarios according to some embodiments of the present disclosure.

Reference is made to FIG. 2. FIG. 2 is a flow chart illustrating operating scenarios according to some embodiments of the present disclosure. As illustrated in FIG. 2, the local device 110 is located in the local environment 210, and the remote device 150 is located in the remote environment 250. The local device 110 is connected with the remote device 150 via the internet communication.

Figure 3:
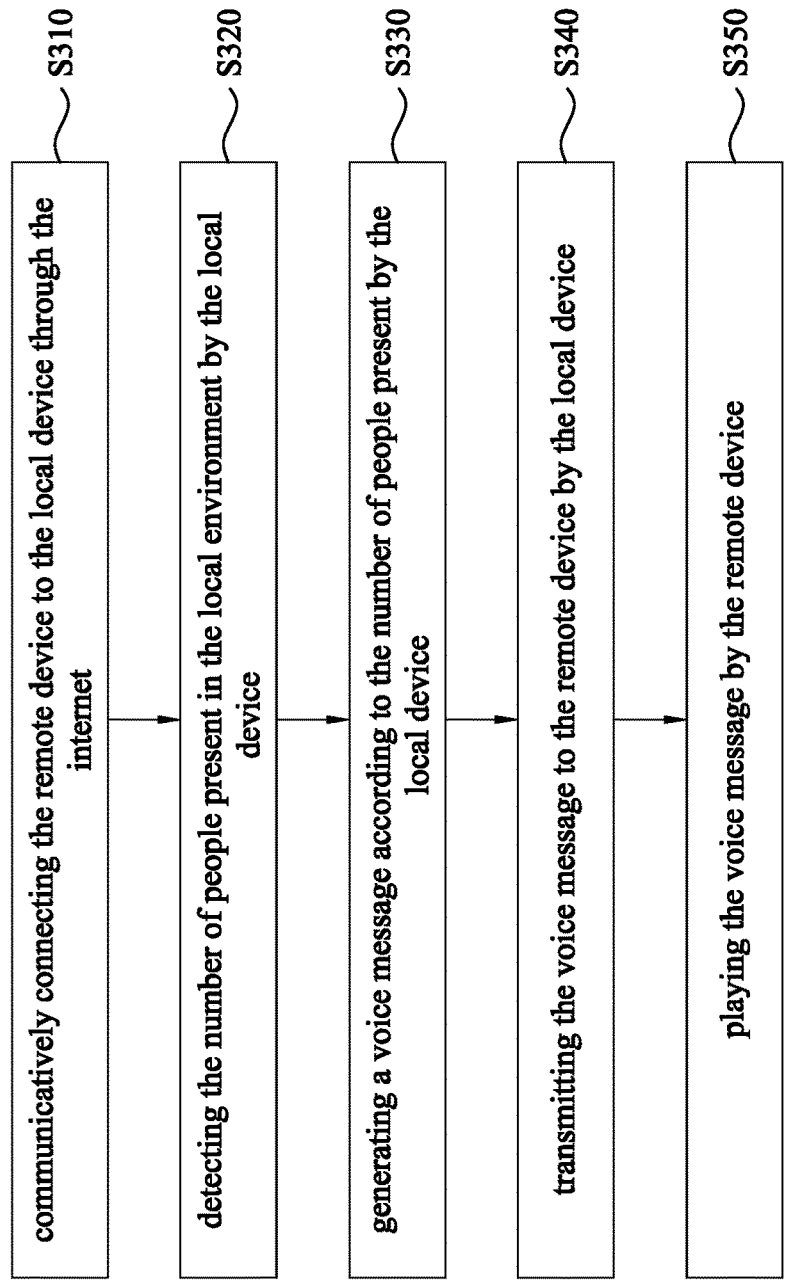
FIG. 3 is a flowchart illustrating the operation method according to some embodiments of the present disclosure.

Reference is made to FIG. 3. FIG. 3 is a flowchart illustrating the operation method 300 according to some embodiments of the present disclosure. The operation method 300 can be applied to the conference system 100 as shown in FIG. 1. Reference is made to FIG. 1 and FIG. 3 together below.

In operation S310, the remote device is communicatively connected to the local device through the internet. In some embodiments, operation S310 is performed by the processor 154 of the remote device 150 in FIG. 1 to communicatively connect the remote device 150 to the local device 110 in FIG. 1 through the internet.

In operation S320, the local device detects the number of people present in the local environment. In some embodiments, in operation S320, after the image capture element 114 of the local device 110 in FIG. 1 obtains the panoramic image of the local environment 210 in FIG. 2, the processor 113 of the local device 110 in FIG. 1 obtains the number of people present according to to the panorama image.

In operation S330, the local device generates a voice message according to number of people present. In some embodiments, operation S330 is performed by the processor 113 of the local device 110 in FIG. 1. For example, when it is determined in operation S320 that the number of people present in the local environment is 3, the local device 110 generates a voice message "Welcome to the video conference, we have 3 people present".

In operation S340, the local device transmits the voice message to the remote device. In some embodiments, operation S340 is transmitted by the processor 113 of the local device 110 in FIG. 1 to the remote device 150 in FIG. 1.

In operation S350, the remote device plays the voice message. In some embodiments, operation S350 is performed by the voice broadcasting element 155 of the remote device 150 in FIG. 1 to play the voice message in a voice manner.

In some embodiments, in operation S330, the processor 113 of the local device 110 further generates a text message according to the number of people present in the local environment, such as the text message "Welcome to the video conference, we have 3 people present." And in operation S340, the above text message is sent to the remote device 150. Then in operation S350, the display element 156 of the remote device 150 displays the received text message.

In some embodiments, the processor 113 of the local device 110 first generates the text message, converts the text message into a voice message through the technology of TTS (text to speech), and then transmits the text message and the voice message to the remote device 150. In some embodiments, the text message and the voice message are temporarily stored in the memory 152 of the remote device 150.

The content of the voice message and text message generated by the above number of people present and generated is for illustration purposes, and the embodiments of the present disclosure are not limited to the above.

In this way, when the participants in the remote environment 250 are connected to the local device 110 through the remote device 150, the participants in the remote environment 250 feel more participated and enjoyment through the play of the greeting as described above and can master the number of people present in the local environment 210.

Figure 4:
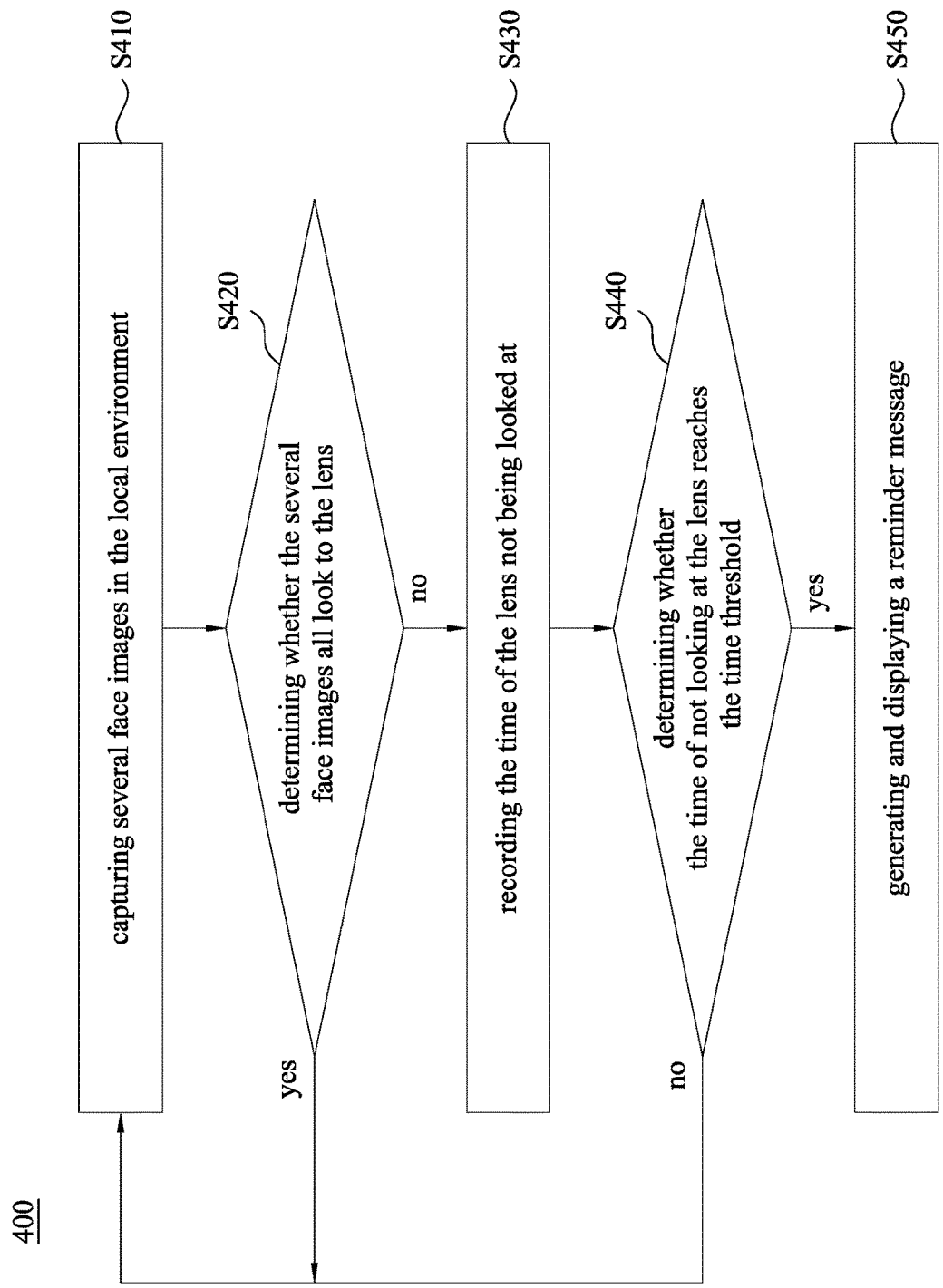
FIG. 4 is a flowchart illustrating an operation method according to some embodiments of the present disclosure.

Reference is made to FIG. 4. FIG. 4 is a flowchart illustrating an operation method 400 according to some embodiments of the present disclosure. The operation method 400 can be applied to the conference system 100 as shown in FIG. 1. Reference is made to FIG. 1 and FIG. 4 together.

In operation S410, several face images in the local environment are captured. Please also refer to FIG. 2. In some embodiments, operation S410 is performed by the image capture element 114 of the local device 110 in FIG. 1 to obtain the face images of the participants P1 to P3 in the local environment 210 as shown in FIG. 2. In some embodiments, the image capture element 114 performs detection every fixed time interval.

In operation S420, it is determined whether the several face images all look towards the lens. In some embodiments, operation S420 is performed by the processor 113 of the local device 110 in FIG. 1. For example, the processor 113 determines whether the several face images all look at the lens 116 of the local device 110 according to the face images obtained in operation S410. Reference is made to FIG. 2. In some embodiments, the lens 116 is disposed on the image capture element 114, and when the participants P1 to P3 look at the display element 115, the processor 113 of the local device 110 may determine that they are not looking at the lens 116.

If it is determined in operation S420 that there is a face image that does not look at the lens 116, operation S430 is executed. However, if it is determined in operation S420 that several face images all look towards the lens 116, operation S410 is executed.

In operation S430, the time when the lens is not looked at is recorded. In some embodiments, operation S430 is performed by the processor 113 of the local device 110 in FIG. 1. In some embodiments, the processor 113 sets a timer to record the time when the lens 116 is not looked at. For example, if the processor 113 determines that the participant P1 does not look at the lens 116, the processor 113 sets a timer corresponding to the participant P1 to start timing. In some embodiments, different participants correspond to different timers.

In operation S440, it is determined whether the time that does not look at the lens reaches the time threshold. In some embodiments, operation S440 is performed by the processor 113 of the local device 110 in FIG. 1. For example, the processor 113 determines whether the time counted by the timer reaches the time threshold. In some embodiments, the time threshold may be 10 seconds. Although this is not a limitation in the embodiments of the present disclosure. Furthermore, in some embodiments, if the participant looks back at the lens 116 after the timer starts timing, the timer stops timing and resets, or resets the time to 0.

If it is determined in operation S440 that the time of the participant not looking towards the lens 116 reaches the time threshold, operation S450 is executed. If it is determined in operation S440 that the time of the participant not looking towards the lens 116 does not reaches the time threshold, operation S410 is executed to continue detecting the face image and continue timing.

In operation S450, a reminder message is generated and displayed. In some embodiments, operation S450 is performed by the processor 113 and the display element 115 of the local device 110 in FIG. 1. For example, if the processor 113 determines that the time period that the participant P1 in FIG. 2 does not look at the lens reaches time threshold of the lens 116, the processor 113 in FIG. 1 generates a reminder message, and the reminder message is displayed by the display element 115 in FIG. 1, to remind participants to look at the lens. In some embodiments, the display element 115 displays the real-time image of the local environment 210 in FIG. 2 and frames the image of the participant P1 who is not looking at the lens. In some other embodiments, the voice broadcasting element 119 of the local device 110 in FIG. 1 plays the reminder message.

In this way, it can be ensured that the participants look at the lens, and the participants in the remote environment 250 will not only see the back of the head or the top of the heads of the participants in the local environment 210, which improves the satisfaction in use.

Figure 5:
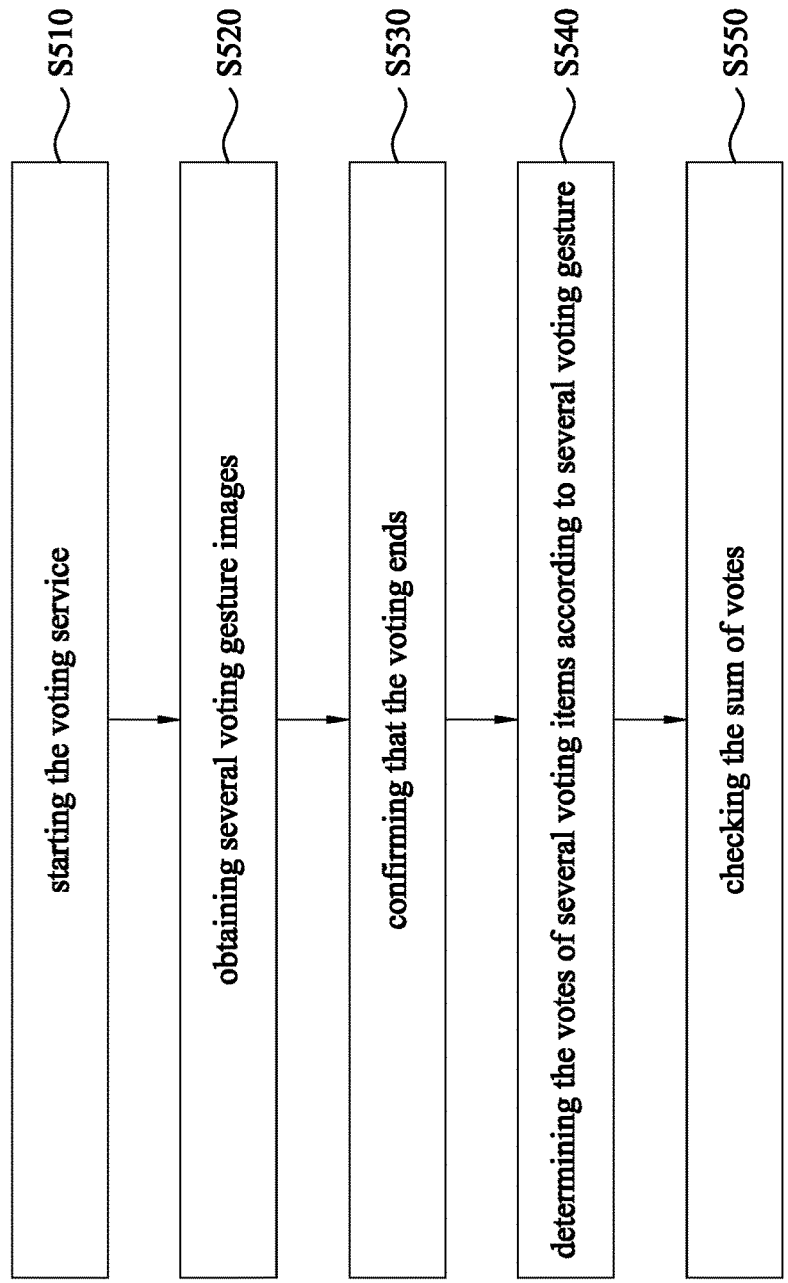
FIG. 5 is a flowchart illustrating an operation method according to some embodiments of the present disclosure.

Reference is made to FIG. 5. FIG. 5 is a flowchart illustrating an operation method 500 according to some embodiments of the present disclosure. The operation method 500 can be applied to the conference system 100 as shown in FIG. 1. Reference is made to FIG. 1 and FIG. 5 together.

In operation S510, the voting service is started. In some embodiments, operation S510 is performed by the processor 113 of the local device 110 in FIG. 1. In some embodiments, when the image capture element 114 in FIG. 1 obtains a specific gesture message or the sound acquisition element 117 obtains a specific sound message, the processor 113 starts the voting service. For example, when the sound acquisition element 117 obtains the specific sound message "Start voting", the processor 113 starts the voting service.

In some embodiments, the sound acquisition element 117 obtains a sound message after the voting service is started, such as "voting "pizza", voting item 1 "seafood", voting item 2 "Hawaii". Next, the processor 113 stores the above-mentioned voting subject "pizza", the voting item 1 "seafood", the voting item 2 "Hawaii" and other information into the memory 112.

In operation S520, several voting gesture images are obtained. In some embodiments, operation S520 is performed by the image capture element 114 of the local device 110 in FIG. 1. For example, after the voting service starts, the participants show voting gestures, and the image capture element 114 obtains several voting gesture images in the local environment 210.

In operation S530, it is confirmed that the voting ends. In some embodiments, operation S530 is performed by the processor 113 of the local device 110 in FIG. 1. In some embodiments, when the processor 113 determines that the vote reaches a preset time (for example, 20 seconds), the voting is ended. In some other embodiments, when the sound acquisition element 117 obtains a specific sound message, such as "end voting", the processor 113 determines that the voting is finished.

In operation S540, the votes of the several voting items are determined according to the several voting gesture images. In some embodiments, operation S540 is performed by the processor 113 of the local device 110 in FIG. 1.

Figure 6:
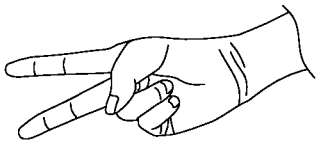
FIG. 6 is a schematic diagram illustrating gesture images according to some embodiments of the present disclosure.

Reference is made to FIG. 6. FIG. 6 is a schematic diagram illustrating gesture images according to some embodiments of the present disclosure. If the gesture image is gesture 1, the processor 113 determines to vote for item 1, and if the gesture image is gesture 2, the processor 113 determines to vote for item 2. In this way, the processor 113 determines the votes of item 1 and the votes of item 2 according to several voting gesture images in the local environment 210 obtained by the image capture element 114.

In operation S550, the sum of votes is checked. In some embodiments, operation S550 is performed by the processor 113 of the local device 110 in FIG. 1. In some embodiments, the processor 113 determines whether the sum of the votes of each item is equal to the number of people present.

For example, in the context of FIG. 2, the number of people present of the local environment 210 is 3. The processor 113 determines whether the total number of voters is the same as the number of people present in the local environment 210 according to the sum of the voting results of item 1 and item 2. For example, when the votes of item 1 is 1, and the votes of item 2 is 2, the processor 113 determines that the total number of votes is the same as the number of people present. At this time, the processor 113 generates a voting result message, for the voice broadcasting element 119 to play the voting result message or the display element 115 in FIG. 1 to display the voting result message. On the other hand, if the processor 113 determines that the votes sum of item 1 and item 2 are not equal to the number of people present, the processor 113 can make the voice broadcasting element 119 play a prompt message or display the prompt message by the display element 115 to remind the presented users to vote or not to repeat voting. For example, voice message can be played through the voice broadcasting element 119 "voting votes is different from the number of people present, please confirm whether to re-vote" or "voting votes is different than the number of people present, please confirm whether the votes are repeated". This ensures that everyone votes. In another embodiment, the processor 113 may display a message of confirming the vote or not to repeat the vote through the display element 115.

In some embodiments, after confirming that the voting votes and the number of people present are the same, the processor 113 generates a voting result message. For example, "Seafood 1 votes, Hawaii 2 votes". The above voting result message can be played through the voice broadcasting element 119 or can be displayed through the display element 115.

The above-mentioned voting item, votes, voting gestures, etc. are only for illustrative purposes, and the embodiments of the present disclosure are not limited to the above.

Figure 7:
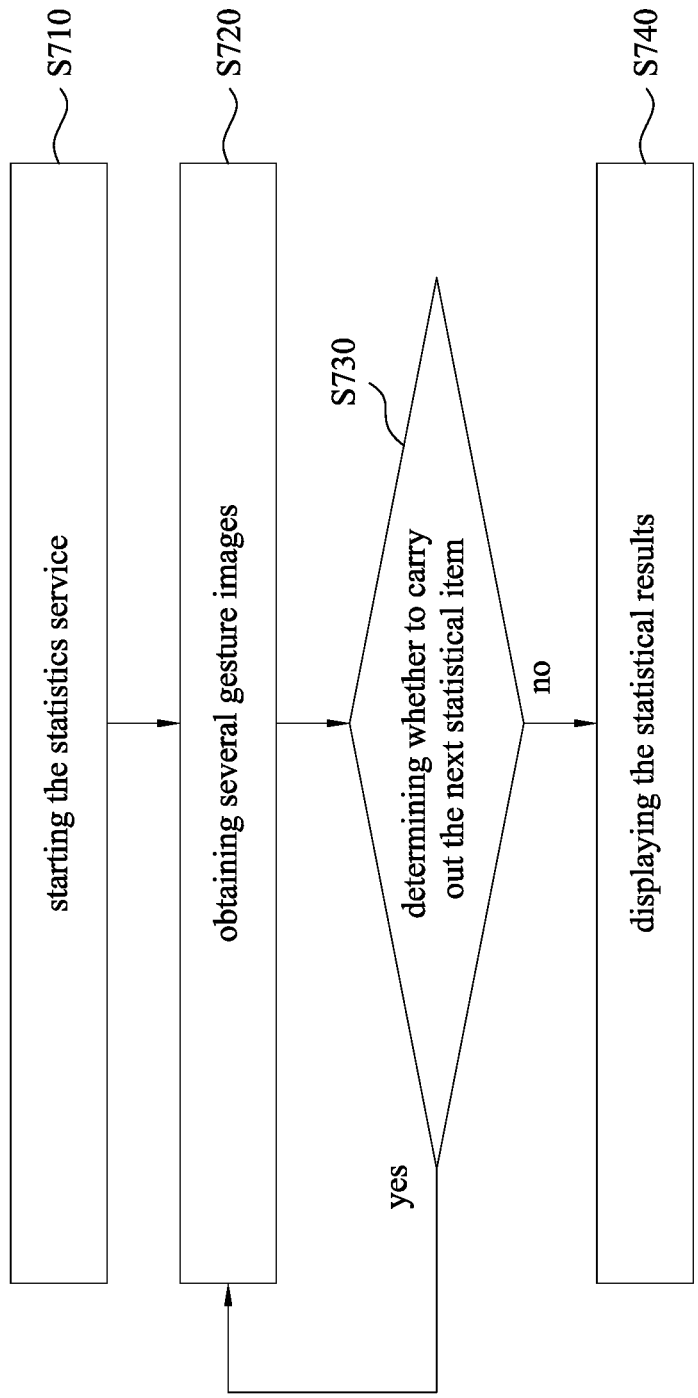
FIG. 7 is a flowchart illustrating an operation method according to some embodiments of the present disclosure.

Reference is made to FIG. 7. FIG. 7 is a flowchart illustrating an operation method 700 according to some embodiments of the present disclosure. The operation method 700 can be applied to the conference system 100 as shown in FIG. 1. Reference is made to FIG. 1 and FIG. 7 together below.

In operation S710, the statistics service is started. In some embodiments, operation S710 is performed by the processor 113 of the local device 110 in FIG. 1. In some embodiments, when the image capture element 114 in FIG. 1 obtains a specific gesture message or the sound acquisition element 117 obtains a specific sound message, the processor 113 starts the statistics service. For example, when the sound acquisition element 117 obtains the specific sound message "Start Statistics", the processor 113 starts the statistics service. In some embodiments, the specific sound message is stored in the memory 112 for the processor 113 to determine whether to start the statistics service.

In some embodiments, the local device 110 obtains the voice element and obtains the sound message. For example, when obtaining the sound message "If you want to drink milk tea, please raise your hand", the processor 113 determines that the first statistical item is "milk tea" according to the sound message. In some embodiments, the processor 113 temporarily stores the first statistical item as "milk tea" in the memory 112.

In operation S720, several gesture images are obtained. In some embodiments, operation S720 is performed by the image capture element 114 of the local device 110 in FIG. 1. For example, after the voting service is started, the people present make specific gesture images, and the image capture element 114 obtains several gesture images in the local environment 210 as several statistical gesture images. In some embodiments, after the image capture element 114 obtains several statistical gesture images, if the processor 113 of the local device 110 determines that the statistical gesture is a specific gesture (for example, raising a hand), the processor 113 determines that the votes is 1 vote.

In operation S730, it is determined whether to carry out the next statistical item. In some embodiments, operation S730 is performed by the sound acquisition element 117 and the processor 113 of the local device 110 in FIG. 1. If it is determined in operation S730 to proceed to the next statistical item, operation S720 is performed. If it is determined in operation S730 that the next statistical item is not to be performed, operation S740 is performed.

For example, in some embodiments, if the sound acquisition element 117 obtains the sound message "next round", the processor 113 determines to perform the next statistical item, and operation S720 is performed. If the sound acquisition element 117 obtains the sound message "end", the processor determines not to proceed to the next statistical item, and operation S740 is performed.

In operation S740, the statistical results are displayed. In some embodiments, operation S740 is performed by the processor 113 of the local device 110 in FIG. 1. For example, in the first round of statistics, the processor 113 determines that the votes of the first statistical item is 3 votes according to several statistical gesture images, and in the second round of statistics, the processor 113 determines that the votes of the first statistical item is 1 according to several statistical gesture images. After the processor 113 arranges the above statistical results, the display element 115 displays the above statistical results. In some embodiments, after the processor 113 arranges the above statistical results, the voice broadcasting element 119 plays a voice message, for example, "3 votes for the first statistical item, 1 vote for the second statistical item".

The above-mentioned specific gestures, specific sound messages, statistical items, votes, etc. are only for illustrative purposes, and the embodiments of the present disclosure are not limited to the above.

In summary, the embodiments of the present disclosure provide a conference system and an operation method, a welcome message is conveyed to the participants in the remote environment that has just connected to the video conference, providing participants with a feeling of welcomed. In addition, in the past, there were desktop video devices with multi-lens, and the lens captured the front row participants but did not do many other services. The embodiments of the present disclosure can automatically remind the participants to look towards the lens, which makes the meeting smoother. Finally, in the embodiments of the present disclosure, the multi-lens video device is used to solve common statistical problems in life, such as: For a celebration after a meeting, someone proposes to order dinner (pizza, fried chicken), and the intelligent system of the embodiments of the present disclosure can be used to quickly and effectively conduct statistics or vote. Moreover, the image recognition technology is combined to calculate votes, which makes it more convenient in use.

Various functional elements have been disclosed herein. For those of ordinary skill in the art, functional elements, modules can be implemented by circuits (whether dedicated circuits, general-purpose circuits or under the control of one or more processors and coded instructions).

Although the present disclosure has been described in considerable detail with reference to certain embodiments thereof, other embodiments are possible. It will be apparent to those skilled in the art that various modifications and variations can be made to the structure of the present disclosure without departing from the scope or spirit of the disclosure. Therefore, the spirit and scope of the appended claims should not be limited to the description of the embodiments contained herein.

What is claimed is:

1. A conference system, comprising:
a remote device, comprising:
a voice broadcasting element; and
a local device, comprising:
a plurality of image capture elements, wherein when the remote device is communicatively connected through an internet to the local device, the plurality of image capture elements obtain a number of people present in a local environment of the local device; and
a processor, coupled to the plurality of image capture elements, wherein the processor generates a voice message according to the number of people present, and the processor transmits the voice message to the remote device, so that the voice broadcasting element of the remote device plays the voice message, wherein the voice message comprises information about the number of people.

2. The conference system of claim 1, wherein the processor of the local device is further configured to generate a text message according to the number of people present, and to transmit the text message to the remote device, wherein the remote device further comprises:
a display element, configured to display the text message.

3. The conference system of claim 1, wherein the local device further comprises:
a lens; and
a display element;
wherein the plurality of image capture elements is further configured to capture a plurality of face images of the local environment, when the processor of the local device determines that a time period of one of a plurality of people present in the local environment not looking at the lens reaches a time threshold according to the plurality of face images, the processor is further configured to generate a reminder message, wherein the display element of the local device is further configured to display the reminder message.

4. The conference system of claim 3, wherein the processor of the local device is further configured to set a timer, and to determine whether the time period of the one of the plurality of people present in the local environment not looking at the lens reaches the time threshold according to the timer.

5. The conference system of claim 1, wherein the processor of the local device is further configured to enable a voting service according to a sound message or a gesture message.

6. The conference system of claim 5, wherein the plurality of image capture elements of the local device are further configured to capture a plurality of voting gesture images in the local environment, wherein the processor of the local device is further configured to determine a plurality of votes of a plurality of voting items of the voting service according to the plurality of voting gesture image.

7. The conference system of claim 6, wherein the processor of the local device is further configured to determine whether a sum of the plurality of votes is equal to the number of people present in the local environment.

8. The conference system of claim 7, wherein when the sum is equal to the number of people present in the local environment, the processor generates a voting result message; and when the sum is not equal to the number of people present in the local environment, the processor generates a prompt message.

9. The conference system of claim 1, wherein the processor of the local device is further configured to start a statistics service according to a sound message or a gesture message.

10. The conference system of claim 9, wherein the plurality of image capture elements of the local device are further configured to capture a plurality of statistical gesture images in the local environment, wherein the processor of the local device is further configured to determine a vote of at least one statistical item of the statistics service according to the plurality of statistical gesture images.

11. An operation method of a conference system, wherein the conference system comprises a remote device and a local device, wherein the operation method comprises:
    obtaining a number of people present of a local environment of the local device by a plurality of image capture elements of the local device when the remote device is communicatively connected through an internet to the local device;
    generating a voice message by a processor of the local device according to the number of people present, and transmitting the voice message to the remote device; and
    playing the voice message by a voice broadcasting element of the remote device, wherein the voice message comprises information about the number of people.

12. The operation method of claim 11, further comprising:
    generating a text message according to the number of people present by the processor of the local device;
    transmitting the text message to the remote device by the processor of the local device; and
    displaying the text message by a display element of the remote device.

13. The operation method of claim 11, further comprising:
    capturing a plurality of face images of the local environment by the plurality of image capture elements of the local device;
    generating a reminder message by the processor when the local device determines a time period of one of a plurality of people present in the local environment not looking at a lens reaches a time threshold according to the plurality of face images; and
    displaying the reminder message by a display element of the local device.

14. The operation method of claim 13, further comprising:
    setting a timer by the processor of the local device; and
    determining whether the time period of the one of the plurality of people present in the local environment not looking at the lens reaches the time threshold according to the timer by the processor.

15. The operation method of claim 11, further comprising:
    enabling a voting service according to a sound message or a gesture message by the processor of the local device.

16. The operation method of claim 15, further comprising:
    capturing a plurality of voting gesture images in the local environment by the plurality of image capture elements of the local device; and
    determining a plurality of votes of a plurality of voting items of the voting service according to the plurality of voting gesture images by the processor of the local device.

17. The operation method of claim 16, further comprising:
    determining whether a sum of the plurality of votes is equal to the number of people present in the local environment by the processor of the local device.

18. The operation method of claim 17, further comprising:
    generating a voting result message by the processor of the local device when the sum is equal to the number of people present in the local environment; and
    generating a prompt message by the processor of the local device when the sum in the local environment is not equal to the number of people present.

19. The operation method of claim 15, further comprising:
    starting a statistics service according to a sound message or a gesture message by the processor of the local device, wherein the statistics service comprises at least one statistical item;
    capturing a plurality of statistical gesture images in the local environment by the plurality of image capture elements of the local device; and
    determining a number of votes corresponding to each of the at least one statistical item of the statistics service according to the plurality of statistical gesture images by the processor of the local device.

20. An operation method of a conference system, wherein the conference system comprises a remote device and a local device, wherein the operation method comprises:
    capturing a plurality of face images of a plurality of people present in a local environment of the local device by a plurality of image capture elements of the local device when the remote device is communicatively connected through an internet to the local device;
    generating a reminder message by a processor of the local device when the local device determines a time period of one of the plurality of people present in the local environment not looking at a lens reaches a time threshold according to the plurality of face images; and
    displaying the reminder message by a display element of the local device or playing the reminder message by a voice broadcasting element.

* * * * *